United States Patent [19]

Livesay

[11] Patent Number: 4,904,536

[45] Date of Patent: Feb. 27, 1990

[54] PROCESS FOR CONTROLLING MONOMERIC EMISSIONS

[76] Inventor: Mark Livesay, 1374 Merritt Dr., El Cajon, Calif. 92020

[21] Appl. No.: 316,609

[22] Filed: Feb. 27, 1989

Related U.S. Application Data

[63] Continuation-in-part of Ser. No. 83,687, Aug. 7, 1987, abandoned, which is a continuation of Ser. No. 804,662, Dec. 4, 1985, Pat. No. 4,720,392.

[51] Int. Cl.$^4$ ............................................. B32B 27/08
[52] U.S. Cl. ................................. 428/515; 428/913; 428/520; 427/54.1
[58] Field of Search ............... 427/54.1, 393.5, 412.3, 427/400; 428/515, 520; 156/275.5, 307.3; 264/22, 171

[56] References Cited

U.S. PATENT DOCUMENTS

| | | | |
|---|---|---|---|
| 2,267,992 | 12/1941 | Palmer | 299/59 |
| 3,953,622 | 4/1976 | Wismer et al. | 427/54.1 |
| 4,017,652 | 4/1977 | Gruber | 427/54 |
| 4,070,497 | 5/1976 | Wismer | 427/54.1 |
| 4,116,788 | 9/1978 | Schmitt et al. | 204/159.23 |
| 4,265,723 | 5/1981 | Hesse et al. | 204/159.23 |

*Primary Examiner*—Edith Buffalow
*Attorney, Agent, or Firm*—John Lezdey

[57] ABSTRACT

A process for forming a coating on an uncured article which emits an olefinic monomeric vapor on curing and controlling the emission of said vapor into the atmosphere which comprises the steps of treating said uncured article with a top coating composition having at least one polymerizable olefinic compound and a polymerization catalyst, at least partially curing the coating composition so as to form a barrier film on the uncured article and then curing the uncured article.

10 Claims, No Drawings

PROCESS FOR CONTROLLING MONOMERIC EMISSIONS

This is a continuation-in-part of 083,687 filed Aug. 7, 1987 and is now abandoned which is a continuation of application Ser. No. 804,662 filed 12/4/85, now U.S. Pat. No. 4,720,392.

FIELD OF THE INVENTION

The present invention relates to a method and composition for controlling the emission of ethylenic monomer vapors into the atmosphere from an article forming process involving unsaturated and/or ethylenic monomer compounds and preferably utilizing the vapors to form a protective coating over the article. More particularly, the present invention relates to a method and composition for preventing the emission of styrene and other monomeric vapors which are emitted during the curing of unsaturated polyester articles and the like. The process preferably depends on the photopolymerizing of a surface layer so as to form a protective envelope over the bulk of the uncured article and then curing the entire article.

BACKGROUND OF THE INVENTION

The photopolymerization of olefinically unsaturated compounds by means of ultraviolet radiation (UV) is well known. U.S. Pat. No. 4,265,723 of Hesse, et al., which is herewith incorporated by reference, discloses the photocuring of polyester resins containing UV sensitizers which are acylphosphine oxide compounds. Hesse et al., also provides a finishing coat of an unsaturated resin on the support which is partially cured with UV and then finally cured after placing on the article.

U.S. Pat. No. 4,116,788 of Schmidt et al. which is incorporated herein by reference, discloses the polymerization of acrylic ester substances by means of benzoin ether and similar UV initiators in the presence of organic phosphate compounds.

U.S. Pat. No. 4,017,652 of G. W. Guber, which is incorporated herein by reference, discloses ultraviolet light curable coating compositions containing resins having acrylic unsaturation and capable of being free radically addition polymerized by interaction with a photocatalyst system upon exposure to ultraviolet light. The coating compositions are intended to provide a hard abrasion resistant film on a substrate such as wood. polyesters, cured acrylics and the like. The patent discloses photosensitizers which may be used in the present invention.

U.S. Pat. No. 3,367,992 to C. R. Beardson discloses thermosetting resin compositions which emit olefinic monomeric vapors wherein the process and compositions of the present inventions can be utilized.

SUMMARY OF THE INVENTION

The present invention relates to a process and composition for use on articles which are to be cured and emit olefinic monomers upon curing. More particularly, the present invention relates to the process of coating and impregnating an uncured article which emits ethylenic monomers with a composition containing a polymerizable olefinic compound and a catalyst, at least partially curing the coating so as to form a protective envelope over the article, and then curing the entire article, while controlling the emission of monomer vapors into the atmosphere.

The present invention provides a photocured molding comprising a photocured resinous matrix wherein said matrix has emitted ethylenic monomer vapors during a photocuring process. A photocured top layer is provided on the matrix which is formed from at least one olefinically unsaturated monomeric compound. A polymeric barrier layer is found between the matrix and the top layer. This barrier layer is formed by said monomeric vapors and the olefinically unsaturated monomeric compound of which said top coat is formed.

In one preferred embodiment of the invention, a coating composition is utilized which contains a polymerizable ethylenic monomer and a sensitizer for the photopolymerization of the monomer. Advantageously, the composition also includes a photoinitiator. The coating is then at least partially cured by irradiation after coating an article which itself is intended to undergo either thermal polymerization or photopolymerization. The at least partially cured coating provides a barrier against the emission of monomer vapors from the article into the atmosphere. The at least partially cured coating further provides a reaction site whereby the monomer vapors which are emitted from the article copolymerize with the monomer of the top coating so as to form a strong polymer bond between the top coat and the article.

In another preferred embodiment of the invention, a top coating is provided which undergoes photopolymerization at a faster rate then the uncured article so that the entire bulk can be photopolymerized together with an outer barrier envelope being first formed prior to any substantial curing of the base article. It has been found that the top coating during photopolymerization helps to initiate the polymerization of the base article because of the exothermic reaction during the photoreaction so that less catalyst is required for the next polymerization step.

It is therefore an object of the present invention to provide a process and a polymerizable composition for coating uncured articles which upon curing emit ethylenic vapors so as to form a protective barrier that controls the emission of the ethylenic vapors into the atmosphere.

It is a further object of the invention to provide a strong adhesive top coating onto articles formed from polymeric olefinically unsaturated compounds.

It is still another object of the invention to reduce monomer evaporation and form a protective non-tacky surface on unsaturated molding compositions which undergo either thermal or photopolymerization processes.

DESCRIPTION OF THE PREFERRED EMBODIMENTS

The coating composition of the invention comprises a mixture of one or more photopolymerizable unsaturated olefinic compounds such as ethylenically unsaturated copolymerizable polyesters and ethylenically unsaturated copolymerizable monomeric compounds, and a UV sensitizer.

Thermally decomposing initiators may also be added for curing in areas where the UV light does not sufficiently reach. The initiators are decomposed by heat generated by photopolymerization.

Any of the conventional UV sensitizers can be utilized. However, since the coating composition is preferably photopolymerized at a faster rate than the substrate on which it is applied, it has been found to be advantageous to utilize a sensitizer selected from the groups consisting of acylphosphine oxides, aliphatic or aromatic phosphites, aromatic phosphates and aromatic ketones or aromatic aldehydes which has a triplet energy in the range of from about 54–72 kilocalories per mole which promotes polymerization through bimolecular photoreactions of the energy donor type.

The acylphosphine oxides are disclosed in the aforementioned Pat. No. 4,265,723 and consist of compounds of the formula

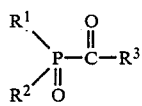

where $R^1$ is straight-chain or branched alkyl of 1 to 6 carbon atoms cyclohexyl, cyclopentyl, aryl which is unsubstituted or substituted by halogen, alkyl or alkoxy, or a S-containing or N-containing five-membered or six-membered heterocyclic radical, $R^2$ has one of the meanings of $R^1$ (but $R^1$ and $R^2$ may be identical or different) or is alkoxy of 1 to 6 carbon atoms, aryloxy or araloxy, or $R^1$ and $R^2$ together form a ring, and $R^3$ is straight-chain or branched alkyl of 2 to 18 carbon atoms, a cycloaliphatic radical of 2 to 10 carbon atoms, phenyl, naphthyl or a S·, O·, or N· containing five-membered or six-membered heterocyclic radical and may contain additional substituents, or is the group where $R^1$ and $R^2$ have the above meanings and X is phenylene or a aliphatic or cycloalipatic divalent radical of 2 to 6 carbon atoms, and one or more of the radicals $R^1$ to $R^3$ may be olefinically unsaturated.

The aliphatic and aromatic phosphates which may be utilized are disclosed in the aforementioned Pat. No. 4,116,788. Examples for the phosphites to be used as activators according to the invention are listed as follows: Dimethylphosphite, dioctyl-phosphite, diphenyl-phosphite, tri-i-octyl-phosphite, tri-stearyl-phosphite, trimethylphosphite, tri-ethyl-phosphite, tri-i-propyl-phosphate. tris-allyl-phosphite, didecyl-phenyl-phosphite, tri-phenyl-phosphite, tris-4-nonphenyl-phosphite, and tris-4-chlorophenyl-phosphite.

The photosensitizers which have a triplet energy in the range of from about 54 to 72 kilocalories per mole which may be utilized are disclosed in Pat. No. 4,017,652 and include benzil, 3,4-benzofluorene, 4-napthaldehyde, 1-acetylnaphthalene, 2,3-butanedione, 1-benzoylnaphthalene, 9-acetylphenanthrene, 3-acetylphenanthrene, 2-napthaldehyde, 2-benzoylnapthalene, 4-phenylbenzoylphenone, 4-phenylacetophenone, anthraquinone, thioxanthone, 3,4 methylenedioxyacetophenone, 4-cyanobenzophenone, 4-benzoylpyrine, 2-benzoylpyrine, 4.4'-dichlorobenzophenone, 4-trifluoromethylbenzophenone, 3-chlorobenzophenone, 4-methoxbenzophenone, 3,4-dimethylbenzophenone, 4-methylbenzophenone, benzophenone, 2-methylbenzophenone, 4,4'-dimenthylphenone, 2,5-dimethylbenzophenone, 2,4-dimenthylbenzophenone. Many of the photoinitiators which may be used in the present invention fall within the formula

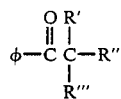

where $\phi$ is phenyl and R', R'' and R''' are each independently hydrogen, halo, alkyl, alkoxy or phenyl, with the proviso that R', R'', and R''' are not concurrently all hydrogen, all alkyl, or all phenyl. The various alkyl, alkoxy and phenyl groups comprising the molecule may be substituted to a minor extent with substituents which will not interfere with the utility of the compound as a photoinitiator. It is preferred that the alkyl, alkoxy and phenyl groups be unsubstituted. Examples of permissible substituents for the phenyl groups are halo, lower alkyl, lower alkoxy, carboxy and carbanoxy.

When R', R'', or R''' is alkyl, it usually contains from 1 to 10 carbon atoms. From 1 to about 6 carbon atoms is typical. From 1 to about 4 carbon atoms is preferred.

When R', R'' or R''' is alkyl, it usually contains from 1 to about 6 carbon atoms. From 1 to about 4 carbon atoms is typical. The preferred alkoxy groups are methoxy and isobutoxy.

When R', R'', and R''' are halo, it usually is fluoro, chloro or bromo. Chloro and bromo are most often used. Chloro is preferred.

Examples of photoinitiators which may be used in the present invention are: Ethyl benzoin ether, isopropyl benzoin ether, butyl benzoin ether, isobutyl benzoin ether, α,α-diethoxyacetophenone, α,α-dimethoxy-a-phenylacetophenone, α,α-diethoxy-α-phenylacetophenone, 4,4'-dicarboethoxybenzoin ethyl ether, benzoin phenyl ether, α-methylbenzoin ethyl ether, α-methylolbenzoin methyl ether, α,α,α-trichloroacetophenone. The preferred photoinitiators are isobutyl benzoin ether and α,α-diethoxyacetophenone. Mixtures of photoinitiators may be used, if desired.

Suitable copolymerizable, ethylenically unsaturated, monomeric compounds are allyl and, preferably, vinyl compounds conventionally used for the preparation of unsaturated polyester moldings, impregnating and coating compositions, for example styrene, substituted sytrenes, eg. p-chlorostyrene or vinyltoluene, esters of acrylic acid and methacrylic acid and methacrylic acid with alcohols of 1 to 18 carbon atoms, eg. methyl methylacrylate, butylacrylate, ethylhexyl acrylate, hydroxpropyl acrylate, dihydrodicyclopentadienyl acrylate and butanediol diacrylate, acrylamides and methacrylamides, allyl esters, eg. diallyl phthalate, and vinyl esters, eg. vinyl ethylhexanoate, vinyl pivalate and the like. Mixtures of the said olefinically unsaturated monomers are also suitable. Preferred components are styrene, α-methylstyrene, chlorostyrene, vinyltoluene, divinylbenzene and diallyl phthalate.

Unsaturated polyesters for the purposes of the invention are not only the conventional unsaturated polycondensation products of, preferably, dicarboxylic acids and glycols, but also unsaturated polyesters containing urethane groups, and unsaturated vinyl ester resins.

Preferred unsaturated polyesters are the conventional polycondensation products of polybasic, especially dibasic, carboxylic acids and their esterifiable derivatives, especially their anhydrous, linked by ester bonds to polyhydric, especially dihydric, alcohols, which products may in addition contain radicals of monobasic carboxylic acids and/or radicals of monohydric alcohols and/or radicals of hydroxycarboxylic acids, and in which products at least some of the radicals must possess ethylenically unsaturated copolymerizable groups.

Suitable polyhydric, especially dihydric, saturated or unsaturated alcohols are the conventional alkanediols and oxa-alkanediols which in particular contain acylic groups, cyclic groups, or both types of groups, for example, ethylene glycol, 1,2-propylene glycol, propane-1,3-diol, 1,3-butylene glycol, butene-1,4-diol, hexane-1,6-diol, 2,2-dimethylpropane-1,3-diol, diethylene glycol. triethylene glycol, polyethylene glycol, cyclohexane-1,2-diol, 2,2-bis-(p-hydroxycyclohexyl)-propane, trimethylolpropane monoallyl ether and butene-1,4-diol. Minor amounts of monohydric, trihydric, or higher polyhydric alcohols, eg. ethylhexanol, fatty alcohols, benzyl alcohols, 1,2-di-(allyloxy)-propan-3-ol, glycerol, pentaerythritol or trimenthylolpropane may also be used.

Suitable carboxylic acids and their derivatives are dibasic olefinically unsaturated, preferably $\alpha,\beta$-olefinically unsaturated, carboxylic acids, eg. maleic acid, fumaric acid, chloromaleic acid, itaconic acid, citraconic acid, methyleneglutaric acid and mesaconic acid and their esters or preferably their anhydrides. The polyesters may additionally contain, as condensed units, other dibasic dicarboxylic acids which act as modifiers and may be unsaturated and/or saturated or aromatic, for example, succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylphthalic acid, tetrachlorophthalic acid, 3,6-endomethylene-1,2,3,6-tetrahydrophthalic acid, endomethylenetetrachlorophthalic acid or hexachloroendomethylenetetrahydrophthalic acid, as well as monobasic; tribasic or higher polybasic carboxylic acids, for example ethylhexanoic acid, fatty acids, methacrylic acid, propionic acid, benzoic acid, 1,2,4-benzenetricarboxylic acid or 1,2,4,5-benzenetetracarboxylic acid. The use of maleic acid, maleic anhydride and fumaric acid is preferred.

Mixtures of unsaturated polyesters, including those which are of only limited solubility in the vinyl monomers and crystallize readily can also be used with advantage. Such readily crystallizing unsaturated polyesters can be synthesized, for exzample, from fumaric acid, adipic acid, terephthalic acid, ethylene glycol, butane-1.4-diol, hexane-1,6-diol and neopentyglycol.

Unsaturated polyesters with preferably terminal double bonds are also suitable.

The unsaturated polyesters have acid numbers of from 19 to 200, preferably from 20 to 85, and mean molecular weights of from about 800 to 6,000, preferably from about 1,000 to 4,000.

The coating compositions of the invention are usually prepared by simply admixing the various ingredients. The compounds comprising the photocatalyst system may be premixed and then admixed with the other ingredients of the coating composition of they may be added separately. Although mixing is usually accomplished at room temperature, elevated temperatures are sometimes used.

The ultraviolet light curable coating compositions of the invention are generally used to form cured adhesive coatings simultaneously while photo-curing the substrates. The substrate is coated with the coating composition using substantially any technique known to the art. These include spraying, curtain coating, dipping, roller application, printing, brushing, drawing, and extrusion. The coated substrate is then exposed to ultraviolet light to cure the coating and substrate and preferably at least a portion of the vapors emitted therefrom into a hard, mar and abrasion resistant film. The amount of photosynthesizer present in the photocatalyst system of the invention may vary widely. Often it is present in the range of from about 5 percent to about 90 percent by weight of the photocatalyst system. An amount in the range of from about 35 percent to about 80 percent is typical. From about 45 percent to about 75 percent is preferred.

The amount of photoinitiator present in the photocatalyst system in the invention may likewise vary widely. Often it is present in the range of from about 0 percent to about 75 percent by weight of the photocatalyst system. An amount in the range of from about 20 percent to about 65 percent is more often used. From about 25 percent to about 55 percent is preferred.

The amount of photosynthesizer present in the ultraviolet light curable coating compositions of the invention may be widely varied. Usually the photosynthesizer is present in any amount in the range of from about 0.01 percent to about 50 percent based on the weight of the binder of the coating composition. More often an amount in the range of from about 0.01 percent to about 20 percent is employed. From about 0.05 to about 10 percent by weight based on the binder is preferred.

The amount of polymerizable monomer having ethylenic bonds available in the coating composition is subject to a wide variation. The monomer together with monomer vapors are usually available in a conventional process and as the UV curing of the unsaturated polyester resins in an amount in the range of from about 20 to 100 percent by weight of the binder of the coating composition. An amount in the range of from about 50 to 90 percent is typical.

Extender pigments which are generally transparent to ultaviolet light are optional ingredients which are often included in the coating composition. Examples of suitable extender pigments are finely divided particles of silica, calcium carbonate, talc, magnesium silicate, aluminum silicate, etc. Extender pigment is generally present in any amount in the range of from about 0 to about 70 percent by weight of the coating composition. An amount in the range of from about 0 to about 50 percent is more often employed. When extender pigment is used, it is usually present in the range of from about 1 to about 35 percent by weight of the coating composition. Although a single extender pigment is ordinarily used, mixtures of several extender pigments are satisfactory.

Ultraviolet light absorbing pigments may optionally be used in amounts which do not preclude curing of the interior of the coating. The maximum amount is therefore related to the thickness of the coating to be cured. Thin coatings may tolerate more ultraviolet light absorbing than pigment than thick coatings. Amounts in the range of from about 0 percent to about 50 percent by weight based on the weight of the binder may be used. For thicker coatings, from about 0 percent to about 25 percent are satisfactory. Examples of suitable ultraviolet light absorbing pigments are titanium dioxide, antimony oxide, zinc oxide, zirconium oxide, zinc sulfide, and lithopone. Mixtures of pigments may be used.

Another optional ingredient which is often included in the coating composition is an inert volatile organic solvent. Mixtures of several inert volatile organic solvents may be used when desired. Like the extender pigment, the inert volatile organic solvent does not ordinarily provide significant additional hiding, but it accelerates the rate at which opacity is obtained. Examples of suitable inert volatile organic solvents are methyl alcohol, propyl alcohol, isopropyl alcohol, butyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naptha. Solvent of this type is ordinarily present in the coating composition in the range of from about 0 to about 40 percent by weight of the vehicle of the coating composition. From about 0 to about 15 percent is typical.

Also, the compositions should contain customarily utilized inhibitors to prevent premature, unwanted polymerization of the hardenable substances in order to obtain ready preparations which are stable for storage purposes. Hydroquinone, ionol, methoxyphenol and other conventional inhibitors are suitable in this instance.

Cured coatings of the ultraviolet light curable coating composition of the invention usually have thicknesses in the range of from about 0.1 to about 100 mils. More often, they have thicknesses in the range of about 1.3 to about 10 mils.

Any suitable source that emits ultraviolet ultraviolet light, viz., electromagnetic radiation having a wavelength in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirling-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2037, 60-0197, 60-0393 and 60-2081 and Hanovia Models 6512A431, 6542A431 and 6477A431.

This time of exposure to ultraviolet light and the intensity of the ultraviolet light to which the coating composition is exposed may vary greatly. Generally the exposure to ultraviolet light should continue until the hard, mar and abrasion resistant films result.

Substrates which may be coated with the compositions of the invention may vary widely in their properties. The substrates are the various uncured molded products which emit monomeric vapors upon curing. The molding compositions may comprise the same or different monomeric or ethylenic compounds utilized in the coating composition of the invention. Preferably, the uncured substrate is cured at a slower rate than the top coating composition. The difference in curing rate can be accomplished through a selection of the photosynthesizers to be utilized.

The invention is additionally illustrated in connection with the following Examples which are to be considered as illustrative of the present invention. It should be understood, however, that the invention is not limited to the specific details of the Examples.

EXAMPLE 1

A. Preparation of top coat composition

Following the procedure described in Pat. No. 3,933,682 a coating composition was prepared as follows:

| Ingredient | Amount (% by wt.) |
| --- | --- |
| Pentaerythritol | |
| Tetraacrylate | 94 |
| Benzil | 2 |
| Triphenylphosphine | 2 |
| Pentachlorobenzene | 2 |

Optionally a photoinitiator such as naphthalenesulfonyl chloride may be added.

B. Preparation of glass fiber-reinforced molding composition.

Glass fiber mat laminates (containing 25% of glass fibers) of 5 and 10 mm thickness were prepared from Derakane 411-45 (a registered trademark) of Dow Chemical Co., Midland, Mich. U.S.A., which is a vinyl ester resin, which was formulated with 0.15% benzil.

C. Preparation of coated article.

The coating composition of step A was applied to the laminates of step B and irradiated with UV light (TUV 40W/05 fluorescent lamps, Philips) at a distance of 15 cm. Within 30 seconds the top coating formed a thin skin around the laminates. Curing continued 30 minutes to insure complete polymerization.

The experiment showed clearly that it was possible to form a barrier layer over the laminate by more rapidly curing the top coating and to contain within the barrier any emissions from the laminate during the main photochemical reaction.

EXAMPLE 2

The procedure of Example 1 was followed except that the tricatalyst benzil, triphenylphosphine and pentachlorobenzene were replaced with an equal amount of 2,6-dimethoxybenzoyl-diphenylphosphine oxide prepared according to the process of U.S. Pat. No. 4,265,723. In this experiment the top coating cured more rapidly.

EXAMPLES 3-6

The following molding compositions were prepared and coated with the coating composition of Example 1 followed by curing with ultraviolet light.

TABLE 1

| Example | U.V. Polymerizable Compound | Filler | Photo-sensitizer |
| --- | --- | --- | --- |
| 3 | Dimethylacrylate | Silica | Benzoin-methylether |
| 4 | Butandiol | Barium sulfate | Benzoin |
| 5 | Trimethylolpropane-trimethacrylate | Hydrated alumina | Tri-ethyl phosphite |
| 6 | Derakane (Vinyl ester resin | Glass fiber mat | Benzoin |

EXAMPLE 7

The procedure of Example 1 was followed except that, in the preparation of the glass reinforced composition, benzil was replaced with benzoyl peroxide. After the composition and coating were subjected to 30 seconds of irradiation with UV light they were placed in an oven and cured at 140° C. for about 3 hours. The top coating formed a barrier which prevented emission of monomeric vapors during thermal polymerization of the laminate. The UV curing of the top coat created an exothermic reduction which initiated curing of the composition before placing it in the oven.

EXAMPLES 8-16

Similarly following the procedure of Example 7, coating compositions were prepared except that in lieu of pentaerythritol tetra acrylate, there was utilized the following unsaturated polyester resins:

| Example | Resin |
|---|---|
| 8 | The Resin is a 65% strength solution, stabilized with 0.01% of hydroquinone, of an unsaturated polyester, obtained from maleic acid, o-phthalic acid, ethylene glycol and 1.2-propylene glycol in the molar ratio of 1:2:2.4:0.70 in styrene. The unsaturated polyester has an acid number of 50. |
| 9 | The Resin is a 67% strength solution, stabilizing with 0.01% of hydroquinone, of an unsaturated polyester, obtained from maleic acid, tetrahydrophthalic acid and diethylene glycol in the molar ratio of 1:0.5:1.5 in styrene. The unsaturated polyester has an acid number of 43. |
| 10 | The Resin is a 66% strength solution, stabilized with 0.01% of hyroquinone, of an unsaturated polyester, obtained from maleic acid, o-phthalic acid and 1,2-propylene glycol in the molar ratio of 1:0.5:1.5 in styrene. The unsaturated polyester has an acid number of 50. |
| 11 | The Resin is a 65% strength solution, stabilized with 0.01% of hydroquinone, of an unsaturated polyester, obtained from maleic acid, isophthalic acid, 1,2-propylene glycol and diethylene glycol in the molar ratio of 1:0.67:0.72:1 in styrene. The unsaturated polyester has an acid number of 26. |
| 12 | The Resin is a 65% strength solution, stabilized with 0.01% of hydroquinone, of an unsaturated polyester, obtained from fumaric acid, adipic acid, neopentylglycol and 1,2-propylene glyco, in the molar ratio of 1:1:1.7:0.35 in styrene. The unsaturated polyester has an acid number of 17. |
| 13 | The Resin is a mixture of 55% of resin of Example 8 and 45% of a 67% strength solution, stabilized with 0.01% of hydroquinone, of an unsaturated polyester, obtained from maleic acid, adipic acid, 1,2-propylene glycol and diethylene glycol in the molar ratio of 1:0.5:0.55:1, in stryene which polyester has an acid number of 30. |
| 14 | The Resin is a 65% strength solution, stabilized with 0.012% of hydroquinone, of an unsaturated polyester, obtained from maleic acid, o-phthalic acid, 1,2-propylene glycol and diethylene glycol in the molar ratio of 1:0.25:1:0.25 in styrene which polyester has an acid number of 43. |
| 15 | The Resin is a 65% strength solution, stabilized with 0.01% of hydroquinone, of an unsaturated polyester, obtained from maleic acid, o-phthalic acid and 1,2-propylene glycol in the molar ratio of 1:1:2 in styrene. The unsaturated polyester has an acid number of 52. |
| 16 | The Resin is a 65% strength solution, stabilized with 0.01% of hydroquinone of an unsaturnated polyester, obtained from maleic acid, o-phthalic acid and 1,2-propylene glycol in the molar ratio of 1:2:3 in styrene. The unsaturated polyester has an acid number of 30. |

The coating compositions of each of Examples 8-16 formed effective barrier films.

What is claimed is:

1. A photocured molding comprising a photocured resinous matrix, said matrix having emitted ethylenic monomer vapors during photocuring, a photocured top layer on said matrix which is formed from at least one olefinically unsaturated monomeric compound, and a polymeric barrier layer between said matrix and said top layer, said barrier layer being formed by said monomeric vapors and the olefinically unsaturated monomeric compound of which said top coat is formed.

2. The molding of claim 1 wherein said top coating and molding are photocurable by exposure to ultraviolet light.

3. The molding of claim 1 wherein said top coating is photocurable and said molding is heat curable and photocuring of said top coating initiates curing of said molding.

4. The molding of claim 1 wherein said top coating comprises at least one photocurable polymerizable olefinic compound and a photosensitizer.

5. The molding of claim 4 wherein said top coating comprises a mixture of an ethylenically unsaturated polyester or vinyl ester resin, one or more ethylenically unsaturated copolymerizable monomeric compound, and a UV sensitizer.

6. The molding of claim 5 wherein said UV sensitizer is a sensitizer selected from the group consisting of acylphosphine oxides, aliphatic or aromatic phosphites and aromatic ketones or aldehydes which has a triplet energy in the range of from about 54-72 kilocalories per mole which promotes polymerization through bimolecular photoreactions of the energy donor type.

7. The molding of claim 5 including in said top coating a photoinitiator.

8. The molding of claim 5 wherein at least part of said olefinic monomeric vapor is copolymerized with said olefinic compound of said partially cured top coating.

9. The molding of claim 8 wherein said olefinic monomeric vapor is styrene.

10. The molding of claim 8 wherein said top coating is formed from a composition which comprises a mixture of
    (a) at least one ethylenically unsaturated polyester or vinyl ester resin,
    (b) at least one ethylenically unsaturated copolymerizable monomer compound,
    (c) a UV photoinitiator, and
    (d) a UV photosensitizer.

* * * * *